O. C. BLAIR.
AUTOMATIC TRAIN PIPE COUPLING.
APPLICATION FILED FEB. 16, 1909.
955,045.
Patented Apr. 12, 1910.
2 SHEETS—SHEET 1.
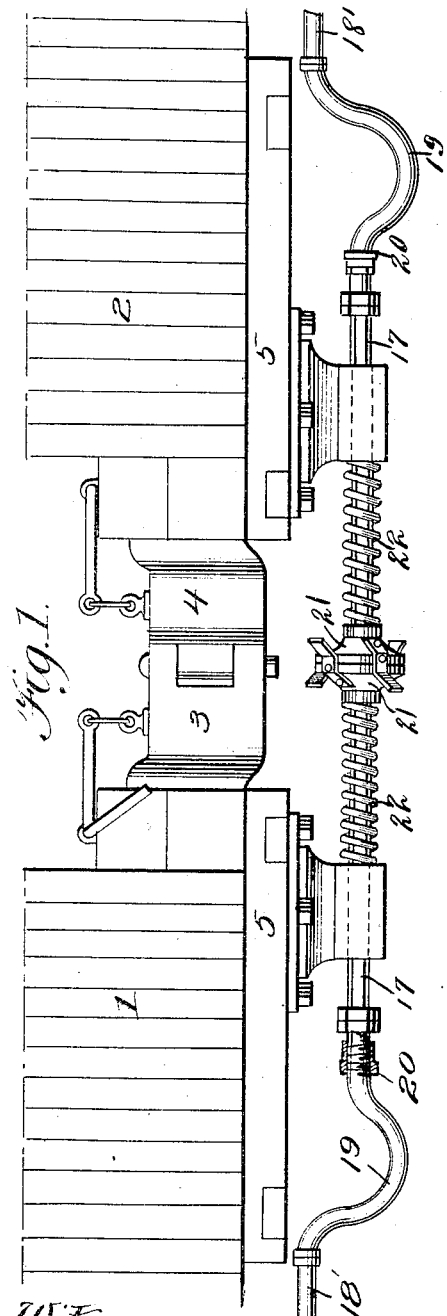
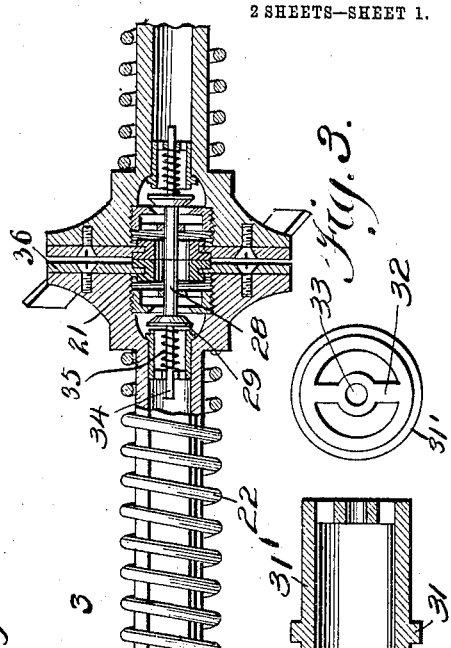
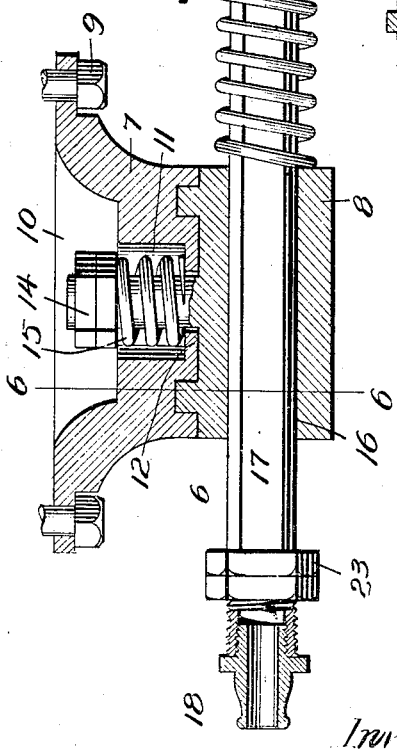
Witnesses.
Inventor,
Oliver C. Blair,
Victor J. Evans,
Attorney.

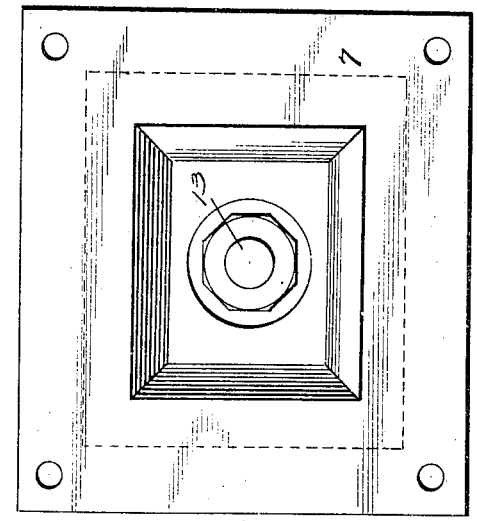
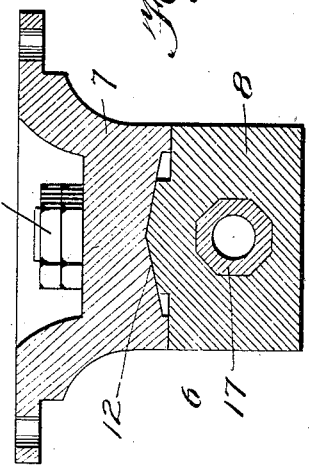
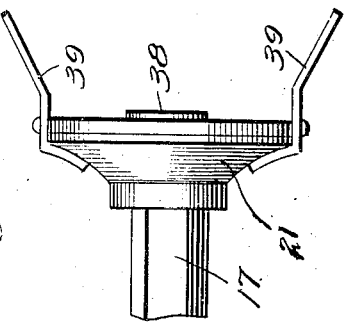
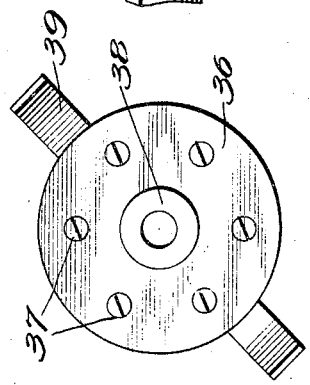
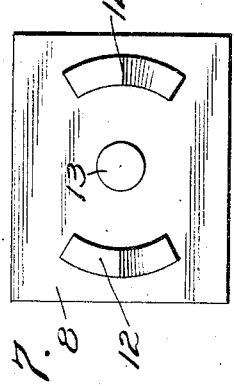
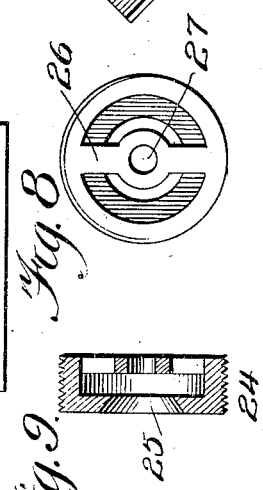

UNITED STATES PATENT OFFICE.

OLIVER C. BLAIR, OF HOUSTON, TEXAS.

AUTOMATIC TRAIN-PIPE COUPLING.

955,045. Specification of Letters Patent. Patented Apr. 12, 1910.

Application filed February 16, 1909. Serial No. 478,256.

*To all whom it may concern:*

Be it known that I, OLIVER C. BLAIR, a citizen of the United States, residing at Houston, in the county of Harris and State of Texas, have invented new and useful Improvements in Automatic Train-Pipe Couplings, of which the following is a specification.

This invention relates to improved couplings for air pipes employed in connection with an air brake system upon cars, and the object of the invention is to provide a device of this character which will automatically couple as the cars are connected together and which provides for the various inclinations of the car when rounding curves or for the slanting of the car body when passing uneven portions of the road bed without danger of the coupling heads becoming disconnected.

Another object of the invention is to provide a coupling of the character set forth which may be easily disconnected from a coacting coupling, and said couplings being each provided with automatic pressure valves whereby the same will close and prevent the exit of air from the air pipes.

With the above, and other objects in view, which will appear as the description progresses, the invention resides in the novel construction and arrangement of parts hereinafter fully described and claimed.

In the drawings, accompanying this specification, there has been illustrated a simple and preferred form of the invention, but it is to be understood that I do not limit myself to the precise structural details therein exhibited, as various changes and modifications within the scope of the invention may be resorted to if desired.

In the drawings, Figure 1 is a side elevation of two sections of pipes constructed in accordance with the present invention and illustrating the same coupled and in applied position upon the cars. Fig. 2 is an enlarged partial central vertical longitudinal sectional view of a pair of the coupling members and their support. Fig. 3 is a front elevation of the valve stem support. Fig. 4 is a central vertical longitudinal sectional view of the same. Fig. 5 is a top plan view of the upper member of the pipe support. Fig. 6 is a transverse sectional view upon the line 6—6 of Fig. 2. Fig. 7 is a top plan view of the lower member of the pipe support. Fig. 8 is an elevation of the valve seat. Fig. 9 is a central vertical longitudinal sectional view of the valve seat. Fig. 10 is a front elevation of the coupling head. Fig. 11 is a side elevation of the same.

In the accompanying drawings the numerals 1 and 2 designate a pair of cars connected together through the medium of the ordinary couplings 3 and 4.

Secured to the draft beams 5 of the cars 1 and 2 are pipe supporting members 6. These members 6 comprise each an upper and a lower section 7 and 8. The upper section 7 is provided with a suitable flange having a plurality of openings adapted for the reception of bolts or other securing elements 9, by which this element is connected with the draft beam or other portions of the car as desired. The upper member 7 has its upper face provided with an enlarged opening 10 terminating in a horizontal wall which is centrally provided with a reduced bore 11 having its lower wall 12 provided with a further reduced opening communicating with the exterior of the base portion of the member 7. The base member 7 has its under face also provided with a pair of spaced arcuate slots having V-shaped upper walls. The lower member 8 is provided with arcuate V-shaped projections 12 adapted to engage within the walls of the arcuate slots of the upper member 7, and this member 8 is also provided with a centrally arranged vertically projecting stud 13 adapted to be positioned within the opening provided by the floor 12 of the member 7 and to have its extremity threaded for the reception of suitable nuts 14. Interposed between the nuts 14 and the floor 12 and surrounding the projecting stud 13 is a helical cylindrical member 15 which is adapted to exert an outward pressure so as to force the lower member 8 into engagement with the upper member 7 thereby producing a yielding connection between the two members.

The lower member 8 is provided with a longitudinally extending, centrally arranged, polygonal opening 16 which is adapted for the reception of a polygonal pipe member 17. This member 17 extends a suitable distance from each side of the support 6 and has its inner end, that is its end projecting beneath the body of the car, rounded and provided with both internal and external threads. The internal threads are adapted for engagement with a threaded nipple 18, by which a flexible connection 19 is provided between the pipe 17 and the main pipe 18' of the car. The external threads may be employed to receive a securing cap 20 provided with the usual flange which is adapted to bear against and tightly secure the flexible pipe 19 upon the nipple 18, or if desired the flexible pipe 19 may be directly connected with the nipple 18. The opposite end of the polygonal pipe is provided with an enlarged head 21, and interposed between the head 21 and the lower member 8 is a helical resilient member 22 which surrounds the extending portion of the pipe 17 and is adapted to force the head 21 outwardly away from the support 6, the outward pressure being limited by suitable stops 23 provided upon the opposite end of the pipe 17. The head 21 is preferably cylindrical and is centrally provided with an enlarged opening communicating with the opening of the pipe 17. The walls of this opening are threaded for a suitable distance and are adapted for the reception of a valve seat 24. The member comprising the valve seat 24 has one of its faces provided with the valve seat proper 25, and its opposite face, which is positioned a suitable distance away from the valve seat proper, is provided with a transverse member or bar 26 having its central portion enlarged and provided with an opening 27 which is adapted to support and guide the forwardly projecting stem 28 of the valve 29.

The numeral 30 designates the valve stem support. This support 30 comprises a sleeve having an annular offset 31 which is adapted to abut against the wall provided by the enlarged opening of the head 21 at its point of communication with the opening of the pipe 17. The sleeve 30' projects a suitable distance within the bore of the pipe 17 and has its inner face provided with a transverse connecting bar 32 having a central opening 33 adapted for the reception of the inner stem 34 of the valve 29. Surrounding the stem 34 and interposed between the valve 29 and the bar 32 is a resilient member 35 adapted to exert outward pressure and to normally close the valve 29 upon the valve seat 25. The face of the head 21 is provided with an outer abutment plate 36 which is secured to the head through the medium of the threaded elements 37 or in any other desired manner, it however, being desirable to have this plate removable so that the parts within the head may be accessible for repairs, etc. The plate 36 is provided with a central opening which is adapted for the reception of a resilient gasket 38. This gasket, as illustrated in Fig. 2 of the drawings, comprises a substantial ring member having its perimeter provided with a continuous slot which is adapted to engage the edges of the plate provided by the central annular cut away portion thereof. The heads 21 are provided with right-angularly arranged oppositely extending inclined guide fingers 39, which are adapted to guide the coacting heads into engagement with each other as the cars 1 and 2 are connected by the couplers 3 and 4.

From the above description taken in connection with the accompanying drawings it will be noted that I have provided a comparatively simple and inexpensive device for the purpose set forth, one which may be readily attached to any ordinary car and readily connected with the pipe system thereof, one which will automatically connect as the cars are brought together for coupling, one wherein the valves automatically close as the cars are parted, one in which the heads are guided toward each other, and one which allows for the various inclinations and curves of the rails without danger of the coupling members becoming disconnected.

Having thus fully described the invention what is claimed as new is:

1. The combination with a pair of co-acting cars of flanged members secured upon the bottom of said cars, said members being provided with a central opening and having a groove arranged concentric with said opening, a plate provided with projecting arcuate members engaging the groove, said plate being also provided with an upwardly extending stem having its extremity threaded, a nut upon the threaded extension, a resilient element between the nut and the flanged member and surrounding the projection, the plate being provided with a longitudinally extending non-circular opening, a non-circular pipe for the opening, headed members for each of the non-circular pipes, means for forcing the headed members away from the plate and toward each other, and valves within the headed members adapted to be opened when the said heads are brought into contact with each other.

2. The combination with an air pipe connection of the character described provided with a polygonal pipe of a yielding support by which the device is connected with the car, said connection comprising a pair of members, the lower member having a polygonal opening for the pipe and having its upper face provided with arcuate V-shaped extensions and a central upwardly projecting stud, the upper member having arcuate slots having their heads V-shaped and adapted to engage the arcuate projections of the lower member, said upper member having a central opening adapted for the reception of the stud, an enlarged member upon the upper portion of the stud, and a spring between the head of the stud and the lower wall provided by the opening of the upper member, substantially as and for the purpose set forth.

In testimony whereof I affix my signature in presence of two witnesses.

OLIVER C. BLAIR.

Witnesses:
STANLEY D. ANTHONY,
J. A. MAHONEY.